United States Patent [19]
Tang et al.

[11] Patent Number: 5,886,336
[45] Date of Patent: Mar. 23, 1999

[54] MULTISIDE COVERAGE OPTICAL SCANNER

[75] Inventors: Hong Tang, Suwanee; Barry M. Mergenthaler, Lawrenceville; Paul O. Detwiler, Lawrenceville; Charles R. Copus, Lawrenceville, all of Ga.

[73] Assignee: NCR Corporation, Dayton, Ohio

[21] Appl. No.: 764,345

[22] Filed: Dec. 12, 1996

[51] Int. Cl.⁶ .............................. G06K 7/10; G06K 15/00; G02B 26/08; G02B 5/128
[52] U.S. Cl. .......................... 235/462; 235/467; 235/383; 235/454; 359/201; 359/217; 359/739
[58] Field of Search .................................... 235/462, 467, 235/383, 454; 359/201, 217, 739

[56] References Cited

U.S. PATENT DOCUMENTS

| | | | |
|---|---|---|---|
| 4,097,729 | 6/1978 | Seligman et al. | 235/467 |
| 4,652,732 | 3/1987 | Nickl | 235/462 |
| 4,713,532 | 12/1987 | Knowles | 235/467 |
| 4,861,973 | 8/1989 | Hellekson et al. | 235/467 |
| 4,960,985 | 10/1990 | Knowles | 235/467 |
| 5,028,772 | 7/1991 | Lapinski et al. | 235/467 |
| 5,132,524 | 7/1992 | Singh et al. | 235/467 |
| 5,206,491 | 4/1993 | Katoh et al. | 235/467 |
| 5,229,588 | 7/1993 | Detwiler et al. | 235/467 |
| 5,684,289 | 11/1997 | Detwiler et al. | 235/467 |

OTHER PUBLICATIONS

U.S. Patent application Ser. No. 08/550,150; filed Oct. 30, 1995.

*Primary Examiner*—Anita Pellman Gross
*Assistant Examiner*—Daniel St. Cyr
*Attorney, Agent, or Firm*—Francis L. Conte

[57] ABSTRACT

An optical scanner includes a housing having first and second obliquely adjoining windows. Disposed in the housing is a laser for projecting a laser beam against a rotatable spinner having a plurality of mirrored facets for sequentially reflecting the laser beam to effect a scan beam. A plurality of pattern mirrors are optically aligned with the spinner for reflecting the scan beam through the first and second windows to effect a plurality of individual scan lines arranged in first and second patterns corresponding with the first and second windows. The pattern mirrors include a triad set of mirrors optically aligned in series between the spinner and the first window for scanning the first scan pattern to a back edge of the first window for scanning at least the back side of a multisided item.

26 Claims, 5 Drawing Sheets

MULTISIDE COVERAGE OPTICAL SCANNER

BACKGROUND OF THE INVENTION

The present invention relates generally to optical scanners, and, ore specifically, to a dual aperture optical scanner.

U.S. Pat. No. 5,229,588—Detwiler et al discloses an exemplary dual aperture optical scanner for reading a bar code positioned on the surface of an article or item. A laser diode projects a laser beam against a polygon spinner having a plurality of mirrored facets which reflect the laser beam in sequence against various pattern mirrors for producing scan lines which project outwardly through horizontal and vertical apertures or windows. The pattern mirrors are arranged in sets of primary and secondary mirrors specifically oriented in space for generating specific scan lines. As the spinner rotates during operation, the scan beam traces the pattern mirrors in sequence for generating a finite number of scan lines. By mounting each facet of the spinner at a different elevation angle, corresponding, parallel sets of scan lines may be generated from the same sets of mirrors.

Each item has several sides and is typically in the form of a rectangular box having six sides including a front side facing the vertical window, an opposite back side, a bottom side facing the horizontal window, an opposite top side, and leading and trailing sides defined by the relative swiping of the item across the windows. A typical bar code includes a series of varying width alternating bars and spaces arranged in a conventional manner, such as a one-dimensional Uniform Product Code (UPC), for recording suitable data such as identity of the item to which it is attached. The bar code is printed on a label which may be mounted on any of the six sides of the item.

By using a dual aperture scanner, more sides of an item may be illuminated with scan lines for increasing the performance of the optical scanner for reading variously positioned bar codes irrespective of the sweeping orientation of the item past the windows. In this way, bar codes may be read with more accuracy and reliability over a greater range of item orientation in space to thereby increase throughput of the items being scanned.

A bar code may be positioned on the item in either a ladder orientation with the bars being spaced apart vertically on the item in a ladder fashion, or in a picket orientation with the bars being spaced apart horizontally in a picket fence fashion. In order to properly read a bar code, a scan line must traverse in sequence the alternating bars and spaces, and therefore ladder bar codes and picket bar codes require different orientation of the scan lines for effecting a successful read thereof.

In a practical configuration of dual aperture optical scanners, a finite number of pattern mirrors and spinner facets may be used to produce a finite number of scan lines which defines the total scan budget. The pattern mirrors are suitably configured and positioned in the limited volume of the scanner housing to produce scan lines of various orientation through the horizontal and vertical windows for reading ladder and picket bar codes over a preferred range of item orientation relative to the windows.

The pattern mirrors are therefore disposed to generate a first pattern of scan lines through the horizontal window, and a second pattern of scan lines through the vertical window which splits the scan budget for covering various sides of the item. The first scan pattern in the horizontal window is configured for scanning at least the bottom side of the item, and the second scan pattern through the vertical window is configured for scanning at least the front side of the item, with limited leading and trailing side coverage of the item also being provided by these two windows.

In U.S. Pat. No. 5,229,588 identified above, the vertical window provides a scan line pattern for scanning both ladder and picket bar codes from the front side of the item. It also provides scan lines for scanning ladder bar codes on the leading and trailing sides. And, the scan line pattern from the horizontal window is effective for scanning bar codes on the bottom side of the item. It also provides scan lines for scanning picket bar codes on the leading and trailing sides. However, this dual aperture scanner lacks the ability to scan the back side of the item, including ladder bar codes thereon.

Accordingly, it is desired to provide an enhanced dual aperture optical scanner effective for additionally scanning the back side of an item, with improved leading and trailing side coverage for ladder bar codes.

SUMMARY OF THE INVENTION

An optical scanner includes a housing having first and second obliquely adjoining windows. Disposed in the housing is a laser for projecting a laser beam against a rotatable spinner having a plurality of mirrored facets for sequentially reflecting the laser beam to effect a scan beam. A plurality of pattern mirrors are optically aligned with the spinner for reflecting the scan beam through the first and second windows to effect a plurality of individual scan lines arranged in first and second patterns corresponding with the first and second windows. The pattern mirrors include a triad set of mirrors optically aligned in series between the spinner and the first window for scanning the first scan pattern to a back edge of the first window for scanning at least the back side of a multisided item.

BRIEF DESCRIPTION OF THE DRAWINGS

The invention, in accordance with preferred and exemplary embodiments, together with further objects and advantages thereof, is more particularly describe in the following detailed description taken in conjunction with the accompany drawings in which.

DESCRIPTION OF THE PREFERRED EMBODIMENT(S)

Figure 1:
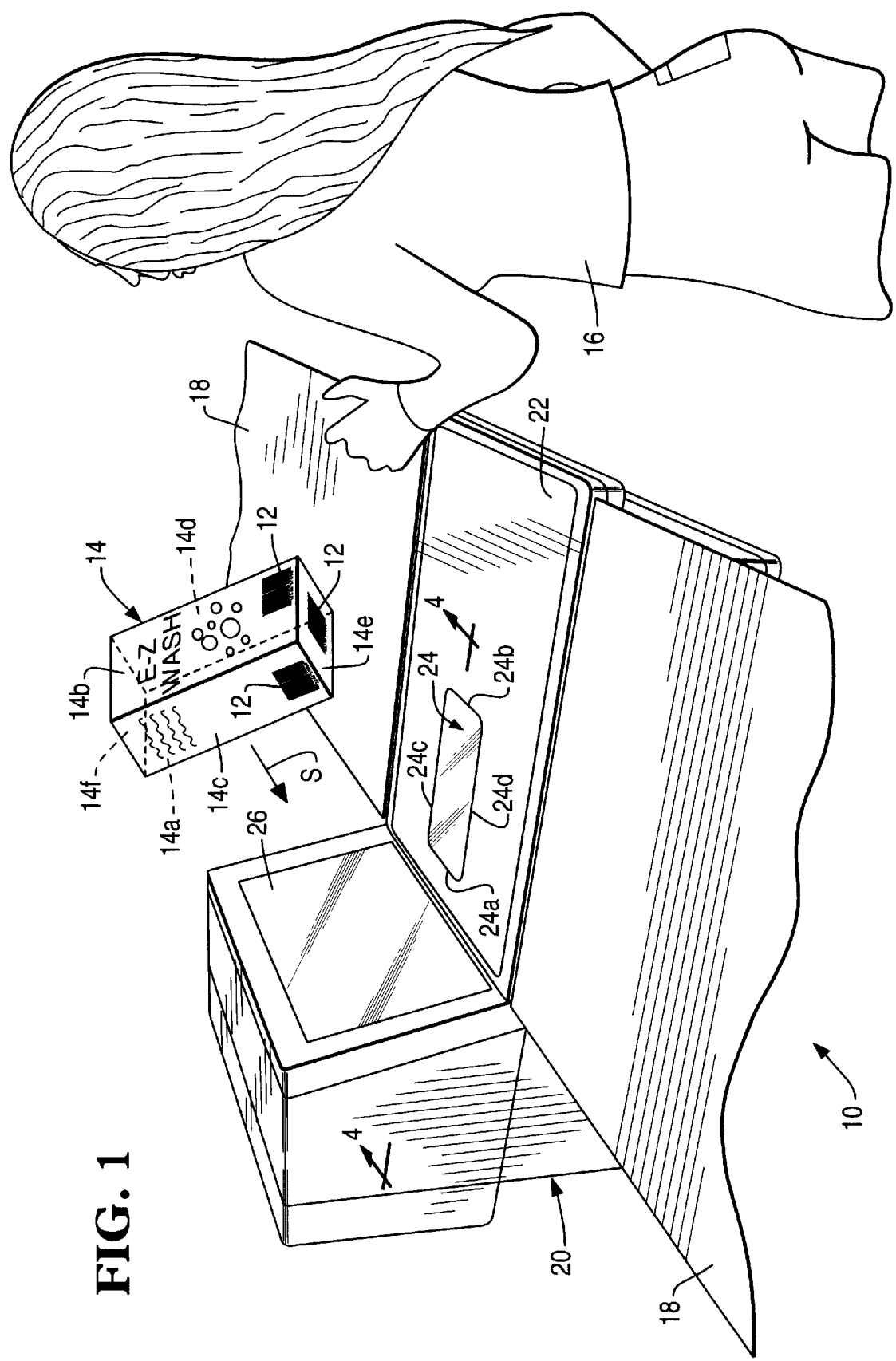
FIG. 1 is an isometric view of a dual aperture optical scanner for scanning a bar code on an item swiped thereacross in accordance with one embodiment of the present invention.

Illustrated in FIG. 1 is an optical scanner 10 in accordance with an exemplary embodiment of the present invention for optically reading a bar code 12 suitably printed on a label secured to a multisided article or item 14. The item 14 may have any suitable configuration, such as the six sided rectangular box illustrated, which is traversed or swiped in the direction S over the scanner 10 manually by a clerk 16.

The scanner 10 may take any suitable form, such as that illustrated in FIG. 1 which is mounted in a counter 18 in a retail store, for example. The scanner 10 includes a suitable housing 20 in which its operating components are disposed. In the exemplary embodiment illustrated in FIG. 1, the scanner 10 is also configured in combination with a weighing scale for weighing the item 14 if desired when placed atop an integral scale tray 22. The scale portion of the scanner 10 may take any conventional configuration and is not part of the present invention.

In accordance with the present invention, the housing 20 includes a substantially horizontal first aperture or window 24 suitably disposed in the tray 22, and a second aperture or window 26 obliquely adjoining the first window 24, and extending generally vertically upwardly therefrom. The first and second windows are made of a suitably transparent material and are configured for scanning the item 14 as it is swiped thereacross. The first window 24 includes a front edge 24a adjacent the second window 26, an opposite back edge 24b adjacent the clerk 16 which defines the check side of the scanner 10, a third edge 24c over which the item 14 may be first traversed, and a laterally opposite fourth side 24d.

Correspondingly, the item 14 includes a front side 14a which faces the second window 26, an opposite back or check side 14b which faces the clerk 16, a leading side 14c which first traverses the windows 24, 26 in the swiped direction S illustrated, an opposite trailing side 14d which follows the leading side 14c, a bottom side 14e which faces downwardly toward the first window 24, and an opposite top side 14f which faces upwardly away from the first window 24. Although the item 14 is illustrated as being swiped from right to left in FIG. 1, it may also be swiped in the reverse direction from left to right which correspondingly redefines the leading and trailing sides of the item 14 relative to the movement of the item over the first window 24.

Figure 2:
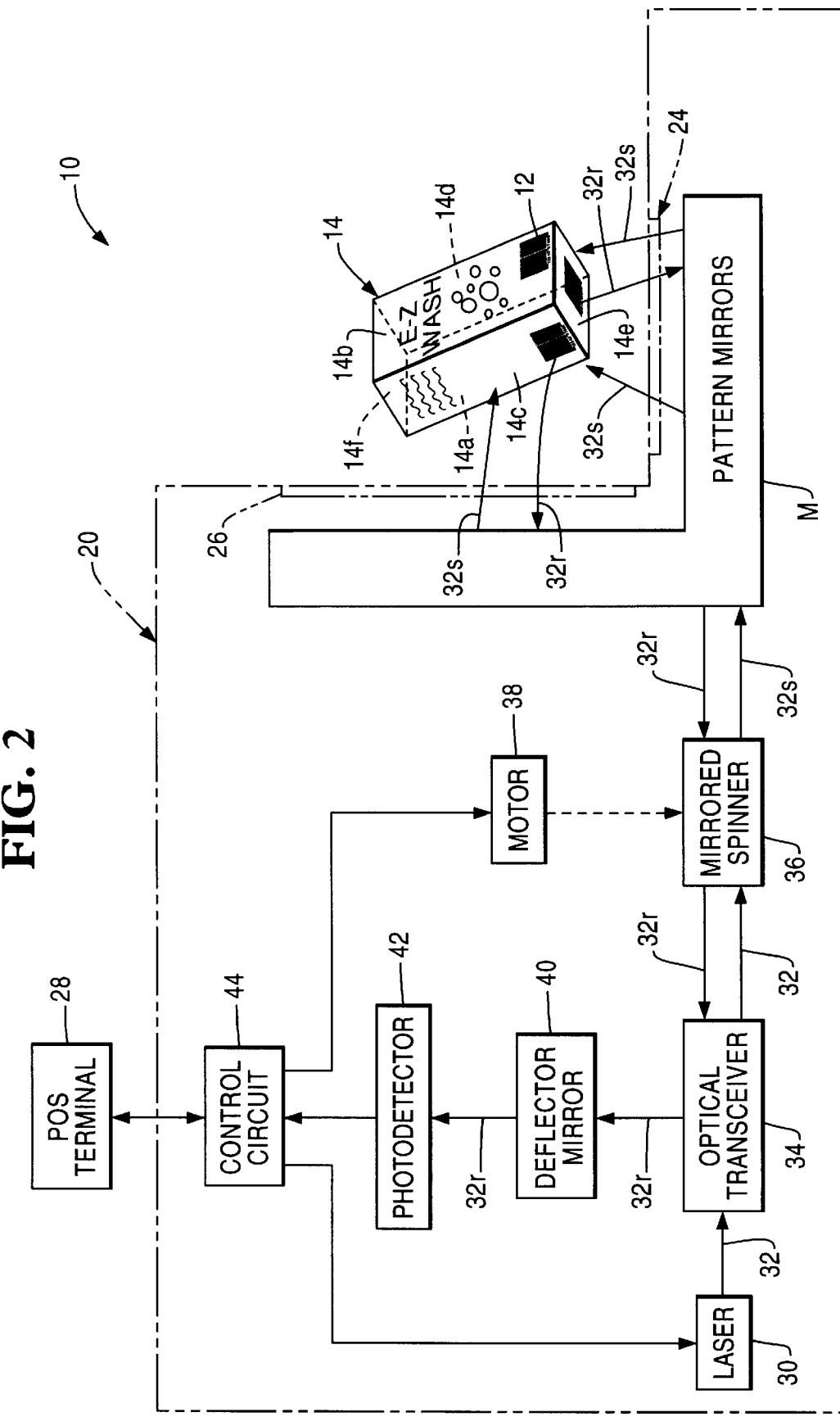
FIG. 2 is a schematic representation of the optical scanner illustrated in FIG. 1.

The scanner 10 is illustrated schematically in FIG. 2 operatively joined to a Point Of Sale (POS) terminal 28 which conventionally receives transaction data from the scanner 10 and completes a transaction by finding price data for the decoded bar code in a price-lookup data file contained therein. The operative components of the scanner 10 are disposed within the housing 20 and include a conventional laser 30 in the exemplary form of a laser diode for providing a suitable laser beam 32.

Figure 3:
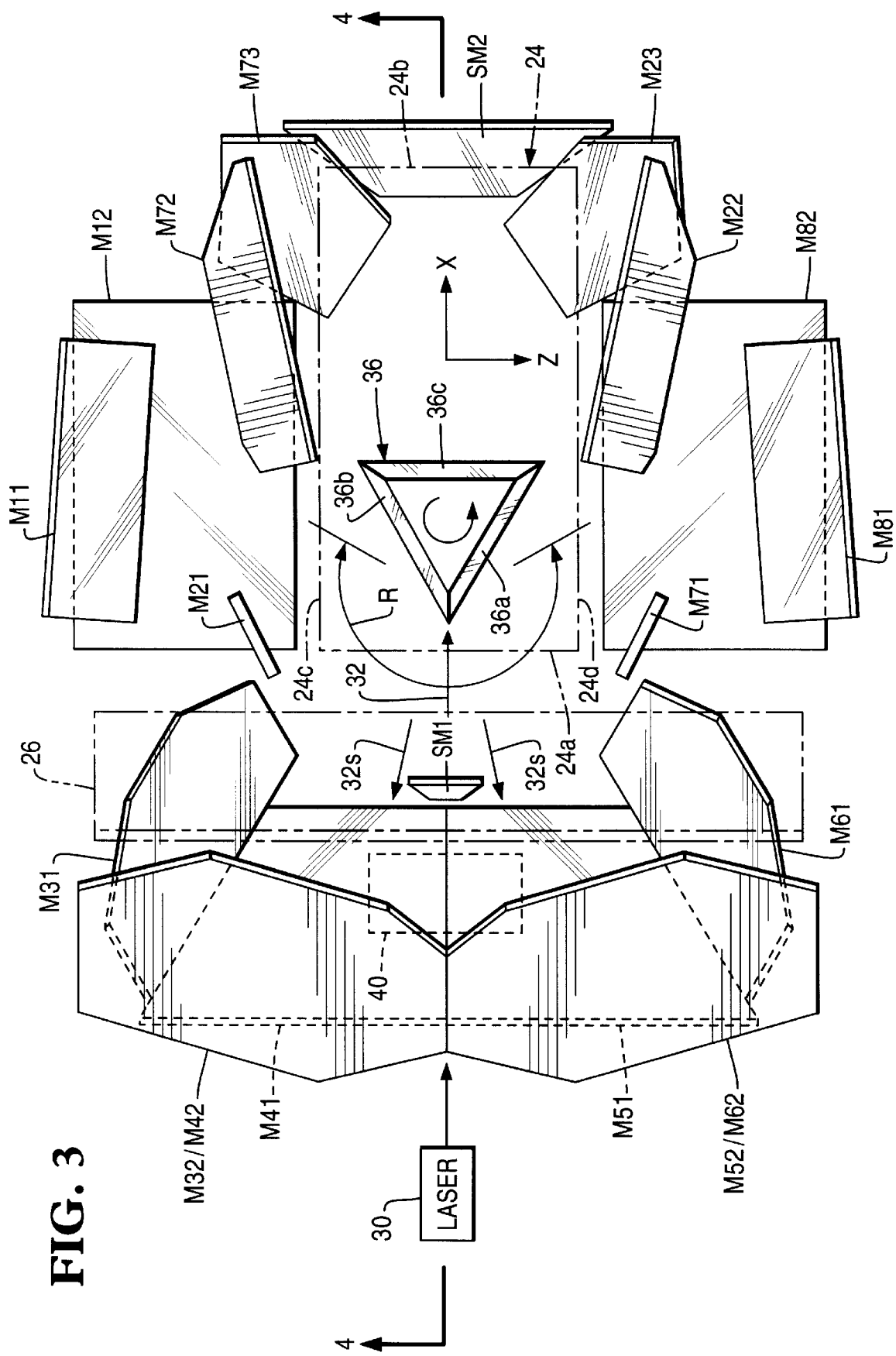
FIG. 3 is a top view of exemplary components of the optical scanner illustrated in FIG. 2.
Figure 4:
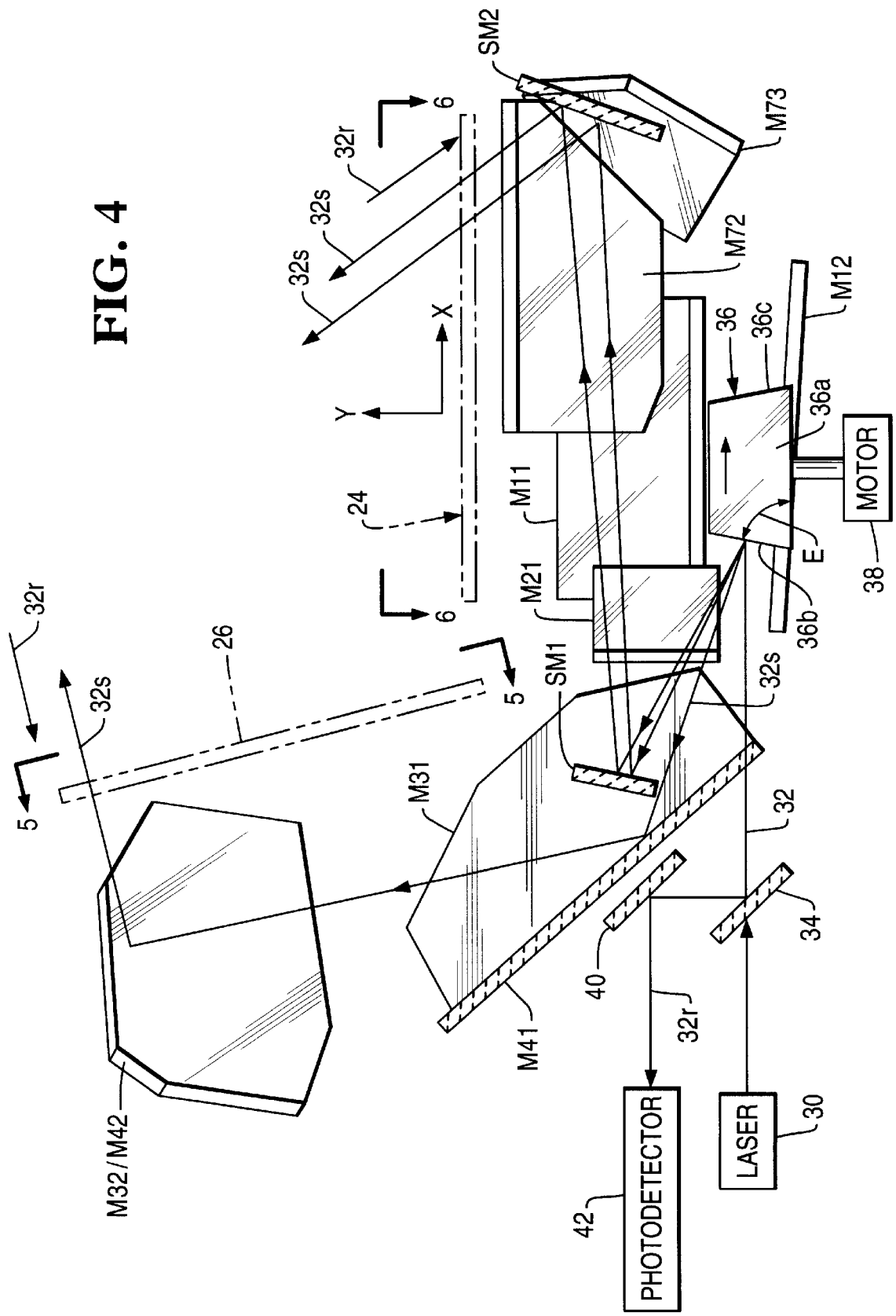
FIG. 4 is an elevational, partly sectional view of the optical scanner illustrated in FIGS. 1 and 3, and taken generally along line 4—4.

The laser 30 is illustrated in more particularity in FIGS. 3 and 4. And, in FIG. 4, a conventional optical transceiver 34 includes an aperture for passing the laser beam 32 therethrough to a suitable rotary spinner 36. The spinner 36 is illustrated in FIGS. 3 and 4 in optical alignment with the laser 30 and is in the form of a polygon. In the preferred embodiment illustrated, the spinner 36 includes three circumferentially adjoining mirrored facets 36a,b,c for sequentially reflecting or scanning the laser beam 32 along an arcuate path to effect a scan beam 32s.

Conventional means in the form of a motor 38 as shown in FIG. 4 are suitably joined to the spinner 36 for rotating the spinner 36 in the exemplary counterclockwise direction illustrated in FIG. 3.

Figure 5:
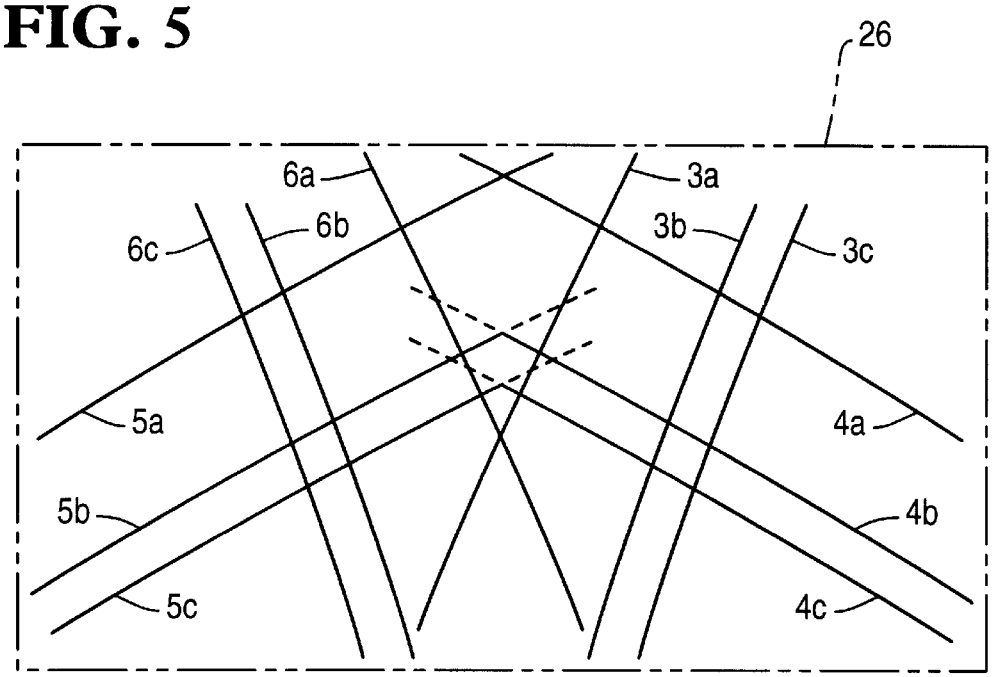
FIG. 5 is a plan view of the vertical window illustrated in FIG. 4 and taken along line 5—5 for showing an exemplary scan line pattern therein.
Figure 6:
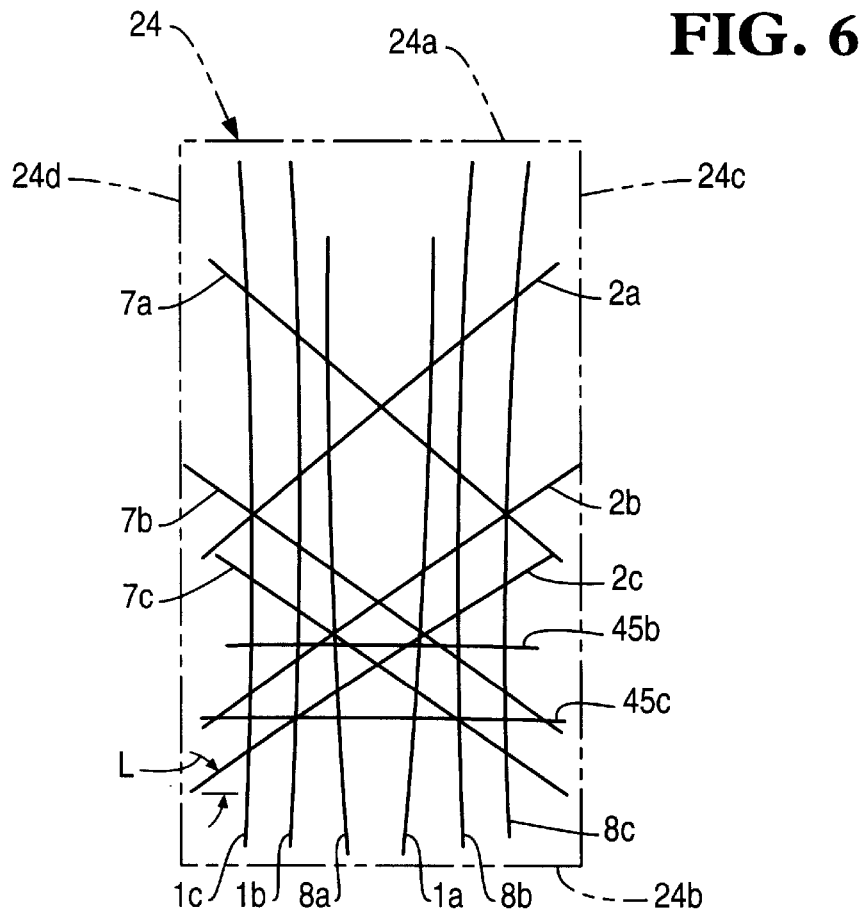
FIG. 6 is a plan view of the horizontal window illustrated in FIG. 4 and taken along line 6—6 for illustrating an exemplary scan pattern therein.

A plurality of pattern mirrors designated generally by the prefix M are suitably mounted in the housing 20 and optically aligned with the spinner 36 for reflecting the scan beam 32s through the first and second windows 24, 26 to effect for each revolution of the spinner 36 a collective plurality of individual and different scan lines illustrated in FIGS. 5 and 6 and identified by the numerical prefixes 1 through 8. The scan lines 1–8 are arranged or grouped by respective ones of the pattern mirrors M in first and second patterns corresponding with the first and second windows 24, 26, respectively, as illustrated in FIGS. 6 and 5.

As shown in FIGS. 2 and 4, one or more of the scan lines 32s will traverse the bars and spaces of the bar code 12 creating a scattered light return beam 32r which returns along the pattern mirrors M and spinner 36 to the optical transceiver 34 from which it is suitably reflected by a deflector or relay mirror 40 from which it is detected by a conventional photodetector 42 optically aligned therewith. The photodetector 42 as illustrated in FIG. 2 is suitably electrically joined to a conventional control circuit 44 which is effective for decoding the return beam 32r from scanning the bar code 12. The decoded signal is suitably carried to the POS terminal 28 for use in a conventional manner such as for looking up the price of the item 14. The control circuit 44 is suitably joined to the laser 30 and the motor 38 for controlling operation of the scanner 10 in a conventional manner.

In the exemplary embodiment illustrated in FIGS. 3 and 4, the three spinner facets 36a–c are preferably flat mirrors extending about 120° each for collectively forming the perimeter of the spinner 36. Since only a finite number of the pattern mirrors M may be mounted in the limited volume within the housing 20, the spinner facets 36a–c are preferably disposed at different elevation angles E as illustrated in FIG. 4 for effecting three different sets of scan lines from the same pattern mirrors for increasing density of the first and second patterns. The three sets of scan lines are illustrated in FIGS. 5 and 6 by the suffix letters a,b,c associated with the scan lines 1–8. Since the same pattern mirrors M are used with each of the three spinner facets 36a–c, the corresponding three sets of scan lines are generally parallel to each other. In this way, more scan line coverage per area may be obtained from the same number of pattern mirrors M. In the exemplary embodiment, the respective elevation angles E of the spinner facets 36a,b,c are 81°, 78°, and 76.95°, respectively.

In accordance with one object of the present invention, it is desirable to scan the back side 14b of the item 14 illustrated in FIG. 2 from the first or horizontal window 24 disposed therebelow. The item 14 is swiped across the windows 24, 26 with the bottom side 14e facing downwardly toward the first window 24, and the front side extending vertically and facing toward the second window 26, and generally parallel thereto, for illuminating thereon the scan lines 1–8. In the preferred embodiment, the first pattern illustrated in FIG. 6 includes ladder scan lines 2 and 7 which project vertically on the item 14 from the back side 14b thereof for reading a ladder orientation of the bar code 12 thereon. Also in the preferred embodiment illustrated in FIG. 6, the first pattern includes a symmetrical set of the ladder scan lines 2 and 7 which project vertically on the item 14 along the back side 14b, as well as on the leading and trailing sides 14c,d thereof. In this way, back side scanning of the item 14 may now be obtained for increasing reliability of scanning of the item 14, while also increasing the effective orientation range of the item 14.

In order to effect back side scanning of the item 14, the pattern mirrors M include a first triad set or sub-group of first, second, and third pattern mirrors designated M21, M22, and M23. The prefix M designates the pattern mirrors generally. The first number of the suffix designates the sequence of the pattern mirrors relative to the rotating spinner 36 and the corresponding mirror set. The second number of the suffix designates the sequence of scan beam reflection from mirror-to-mirror in each pattern mirror set, with −1 being a primary mirror, −2 being a secondary mirror, etc.

In the exemplary embodiment illustrated in FIGS. 3 and 4, there are eight sets of pattern mirrors designated by the alternate prefix M1 through M8, with each set including a primary mirror, e.g. M11, M21, etc., and two or three secondary mirrors designated by the suffix 1, 2, 3. Presented below is Table 1 which defines the several pattern mirrors and their orientation in space relative to an X, Y, Z coordinate system centered in the top of the first window 24 as illustrated in FIGS. 3 and 4.

The X-axis represents the longitudinal centerline axis of the first window 24 and scanner 10, and is directed in an aft direction from the second window 26. The Y-axis extends vertically and perpendicularly upwardly from the first window 24. And, the Z-axis extends laterally in the horizontal plane of the first window 24 in the exemplary direction of swiping S. The X, Y, Z coordinates of each of the pattern mirrors is listed in millimeters at the center of the respective mirror, and three conventional direction cosines COS (A), COS (B), and COS (C) identify orientation of the normal vectors of the plane of the pattern mirrors.

form the second scan line 2a. The second and third spinner facets 36b,c similarly generate the symmetrical scan lines 2b,c.

The respective sets of pattern mirrors including primary pattern mirrors M11, M31, M41, M51, M61, and M81 are conventional in configuration and orientation for producing the respective scan lines therefrom, except as further explained hereinbelow.

The first triad set of pattern mirrors M21, M22, and M23 provides in accordance with the present invention new back side scanning capability within the limited volume of the housing 20. These three triad mirrors are optically aligned between the spinner 36 and the first window 24 as illustrated in FIGS. 3 and 4 for relaying or extending the first scan pattern to the back edge 24b of the first window 24 as illustrated in FIG. 6. As shown in FIG. 3, the laser 30 is colinearly aligned with the spinner 36 below the first window 24 along the longitudinal centerline X-axis for projecting the laser beam 32 from the front toward the back edges 24a,b of the first window 24. The window front edge 24a is disposed on the forward side of the spinner 36 with the back edge 24b being disposed aft of the spinner 36 in this configuration.

Each of the spinner facets 36a–c illustrated in FIG. 3 has an equal angular coverage or range R during rotation within which the laser beam 32 from the laser 30 is reflected as the scan beam 32s along the arcuate path traced by the rotating

TABLE 1

Mirror Definition

| Mirror | Coordinates of the Center of Mirror | | | Direction Cosines of the Normal | | | Scan Line |
|---|---|---|---|---|---|---|---|
| | X | Y | Z | COS(A) | COS(B) | COS(C) | |
| M11 | −10.6691 | −63.4225 | −112.9324 | −0.0584 | −0.5328 | 0.8442 | |
| M12 | −7.7222 | −107.3025 | −86.3600 | 0.0612 | 0.9981 | 0 | 1a,b,c |
| M21 | −58.8395 | −73.0250 | −64.9540 | 0.4518 | −0.0858 | 0.8880 | |
| M22 | 27.7535 | −51.4470 | 63.4307 | 0.1917 | −0.4397 | −0.8774 | |
| M23 | 78.4805 | −55.7750 | 62.2500 | −0.7442 | 0.6617 | −0.0914 | 2a,b,c |
| M31 | −124.7245 | −48.9998 | −80.9834 | 0.1422 | 0.5736 | 0.8067 | |
| M32 | −157.747 | 61.4026 | −69.2729 | 0.8243 | −0.4695 | 0.3164 | 3a,b,c |
| M41 | −147.762 | −43.4927 | 0 | 0.7372 | 0.6756 | 0 | |
| M42 | SAME AS M32 | | | | | | 4a,b,c |
| SM1 | −107.6000 | −59.8389 | 0 | 0.9832 | −0.1822 | 0 | |
| SM2 | 88.2551 | −49.0432 | 0 | −0.9135 | 0.4067 | 0 | 45b,c |
| M51 | SAME AS M41 | | | | | | |
| M52 | −157.747 | 61.4026 | 69.2729 | 0.8243 | −0.4695 | −0.3164 | 5a,b,c |
| M61 | −124.7245 | −48.9998 | 80.9834 | 0.1422 | 0.5736 | −0.8067 | |
| M62 | SAME AS M52 | | | | | | 6a,b,c |
| M71 | −58.8395 | −73.0250 | 64.9540 | 0.4518 | −0.0858 | −0.8880 | |
| M72 | 27.7535 | −51.4470 | −63.4307 | 0.1917 | −0.4397 | 0.8774 | |
| M73 | 78.4805 | −55.7750 | −62.2500 | −0.7442 | 0.6617 | 0.0914 | 7a,b,c |
| M81 | −10.6691 | −63.4225 | 112.9324 | −0.0584 | −0.5328 | −0.8442 | |
| M82 | −7.7222 | −107.3025 | 86.3600 | 0.0612 | 0.9981 | 0 | 8a,b,c |

As shown in FIG. 3, the spinner 36 rotates counterclockwise in this exemplary embodiment, with the laser beam 32 reflecting off each of the spinner facets 36a–c in turn to form the scan beam 32s which is reflected in turn from each of the pattern mirrors M11 through M81. For example, the scan beam 32s is reflected from the first pattern mirror M11 in turn off the secondary pattern mirror M12 to form scan lines 1a,b,c from the respective spinner facets 36a,b,c. As the first facet 36a rotates counterclockwise, the scan beam 32s passes from the first primary mirror M11 to the second primary mirror M21, which in turn reflects the scan beam 32s off the secondary and tertiary mirrors M22 and M23 to spinner 36. The annular coverage R is conventionally determined by dividing 720° by the number of facets, with the three facets illustrated therefore each having an annular coverage R of 240°. As the number of facets increases the angular coverage R decreases and affects the scan budget and scan patterns.

In the embodiment illustrated in FIG. 3, there is only a single laser 30 which cooperates with the spinner 36 for producing the entire scan budget. Since there are three spinner facets and eight primary pattern mirrors, the scan budget is limited to 24 scan lines 1a,b,c through 8a,b,c.

Since the back two corners of the first window 24 illustrated in FIG. 3 are effectively hidden from the laser beam 32 outside the annular coverage R, it is impossible to generate vertical or ladder scan lines in these corners using conventional primary and secondary pattern mirrors.

In accordance with one object of the present invention, the first triad set of pattern mirrors M21–M23 are optically aligned with each other as illustrated in FIGS. 3 and 4 for projecting ladder scan lines 2a,b,c through the first window 24 obliquely relative to the back edge 24b for projecting the scan beam 32s vertically through the first window to read the bar code 12 in vertical or ladder orientation on the item 14. The oblique angle of the ladder scan lines 2a,b,c is designated L in FIG. 6 and is suitably large so that the projection of the ladder scan lines 2 in the vertical direction on the item 14 are effective for traversing a ladder bar code. In the exemplary embodiment illustrated in FIG. 6, the oblique angle is within the exemplary range of about 30°–45°.

As shown in FIG. 3, a pair of the triad sets of pattern mirrors are preferably disposed symmetrically about the spinner 36 along the third and fourth edges 24c,d of the first window 24 for respectively scanning the laser beam 32 from the spinner 36 to effect a symmetrical set of the oblique ladder scan lines 2 and 7 adjacent to the back edge 24b of the first window 24. FIG. 3 illustrates the first triad set of pattern mirrors M21, M22, M23 and the second set of triad mirrors M71, M72, and M73 shown symmetrically disposed on opposite sides of the centerline X-axis.

The second primary mirror M21 reflects the scan beam 32s from the spinner 36 at the upper left corner of the first window 24 illustrated in FIG. 3 on one side of the spinner 36 to the secondary mirror M22 at the lower right corner of the window on the opposite side of the spinner 36. Similarly, the seventh primary mirror M71 reflects the scan beam 32s from the spinner 36 at the lower left corner of the window 24 on one side of the spinner 36 to the secondary mirror M72 at the upper right corner of the window 24 on the opposite side of the spinner 36.

In this way, the scan beam 32s is effectively relayed behind the spinner 36 for reaching the vicinity of the back edge 24b of the window 24 for being reflected upwardly through the first window 24 for reading the back side of the item 14. Since the respective secondary and tertiary mirrors M22, M23 and M72, M73 are disposed near corresponding opposite corners of the back edge of the window 24, the corresponding ladder scan lines 2a,b,c and 7a,b,c, not only project toward the item back side 14b but also along the item leading and trailing sides 14c,d, respectively, for reading the ladder bar code 12 placed thereon.

The first triad mirror set is positioned in part, e.g., primary mirror M21, within the angular coverage R for first deflecting the scan beam 32s from the spinner 36. The first triad mirror M71 of the second set is symmetrically disposed on the opposite side of the spinner 36 within the angular coverage R.

The corresponding second and third triad mirrors of the two sets, i.e. M22, M23 and M72, M73, are disposed together at diametrically opposite back corners of the first window 24 for reflecting in turn the scan beam 32s from respective ones of the first triad mirrors M21 and M71 to project the scan beam vertically through the first window 24.

The mirrors of the two triad sets as illustrated in FIG. 3 are preferably optically aligned to effect an intersecting pair of the symmetrical oblique scan lines 2 and 7 through the first window 24 as illustrated in FIG. 6 so that each triad set is effective for reading the ladder bar code 12 on the item back side 14b, and on a different one of the leading and trailing sides 14c,d. In a single swipe of the item 14 across the first window 24, the first triad set can read a ladder bar code on the back and leading sides 14b,c of the item 14. And, the second triad set can read a ladder bar code on the back and trailing sides 14b,d of the item 14. FIG. 6 illustrates the two sets of ladder scan lines 2 and 7 intersecting each other generally along the centerline axis of the first window 24. The vertical projections of these oblique scan lines 2,7 on the item 14 are effective for covering the leading, back, and trailing sides 14b,c,d of the item 14 in one swipe.

In order to maximize the scan budget and coverage using the single laser 30, the pattern mirrors M are preferably symmetrically arranged or disposed about the spinner 36 in two symmetrical main groups about the centerline X-axis and generally along the third and fourth edges 24c,d of the first window 24 to effect symmetrical scan lines in each of the first and second patterns illustrated in FIGS. 5 and 6. Table 1 also lists the corresponding scan lines from the last pattern mirror in each set, with the eight sets of pattern mirrors M1–M8 effecting the corresponding scan lines 1–8. As indicated above, the three differently inclined spinner facets 36a,b,c produce parallel sets of the scan lines designated by the suffix a,b,c for a total of twenty-four scan lines produced by the eight mirror sets, and split evenly between the first and second windows 24, 26.

The first main group of pattern mirrors includes the first four primary mirrors M11, M21, M31, and M41. The second main group of pattern mirrors includes the last four primary pattern mirrors M51, M61, M71, and M81. These two groups of primary mirrors including their corresponding secondary mirrors are arranged symmetrically about the longitudinal centerline X-axis. The first group effects the first four scan lines 1, 2, 3, 4 and their parallel sets, and the second group effects the last four scan lines 5, 6, 7, and 8, and their parallel sets. As shown in FIGS. 5 and 6, scan lines 8, 7, 6, and 5 correspond with scan lines 1, 2, 3, and 4, respectively, in symmetrical extent and orientation.

The orientation of the scan lines 1, 3, 4, 5, 6, and 8 are conventional and are analogous to corresponding scan lines produced in the dual aperture scanner disclosed in U.S. Pat. No. 5,229,588 identified above. The corresponding pattern mirrors therefore are similarly conventionally configured and positioned within the housing 20. Note that the secondary pattern mirrors M32 and M42 are the same mirror which cooperates with the different primary mirrors M31 and M41. Similarly, the secondary pattern mirror M52 is the same as the secondary mirror M62 which cooperates with different primary mirrors M51 and M61. Note also that the fourth and fifth primary mirrors M41 and M51 intersect each other in a common flat mirror which extends laterally across the centerline X-axis.

The eight sets of pattern mirrors including the two new triad sets of pattern mirrors described above are effective for producing an improved scan line coverage in the first and second patterns illustrated in FIGS. 5 and 6 for providing new back side, ladder bar code reading capability of the item 14. The longitudinally extending scan lines 1 and 8 illustrated in FIG. 6 are effective for conventionally reading the bottom side 14e of the item 14. However, the ladder bar code reading capability of the first pattern illustrated in FIG. 6 is provided at an expense since only a finite number of scan lines are provided, which in this case is a total of twenty-four scan lines. The ladder scan lines 2 and 7 illustrated in FIG. 6 are provided by the triad sets at the expense of picket scan lines which could otherwise be provided in the first window 24 without the use of the triad sets. Picket scan lines in the first pattern illustrated in FIG. 6 must extend generally parallel to the back edge 24b of the first window 24.

In accordance with another feature of the present invention, the scanner 10 is further configured for steering or intercepting a portion of the scan lines from the second window 26 to the first window 24, which are designated as steered scan lines 45b,c. By suitably steering the selected scan line portions generally parallel to the item bottom 14e, the steered scan lines effect picket scan lines 45b,c for reading a picket orientation of the bar code 12 on the back side of the item 14.

This scan is accomplished by means in the form of first and second steering mirrors SM1 and SM2 which are separately disposed symmetrically with the spinner 36 about the centerline X-axis as shown in FIGS. 3 and 4. The first and second steering mirrors SM1,2 are preferably flat mirrors sized and positioned in optical alignment with the spinner 36 to intercept a suitable scan line portion from at least one of the spinner facets 36a–c.

In the exemplary embodiment illustrated in FIGS. 3 and 4, the first steering mirror SM1 is a primary mirror optically aligned between the spinner 36 and a selected portion of the pattern mirrors within the angular coverage R for first intercepting the scan line portion in the pattern mirrors and from the second window 26. The second steering mirror SM2 is a secondary mirror optically aligned with the first steering mirror SM1 on an opposite side of the spinner 36. As shown in FIG. 3, the first steering mirror SM1 is disposed forward of the spinner 36, and the second steering mirror SM2 is disposed aft of the spinner 36, both symmetrically straddling the centerline X-axis symmetrically with the spinner 36.

In the exemplary embodiment illustrated in FIGS. 3 and 4, the pattern mirrors include the common mirror M41/M51 which is disposed symmetrically with the spinner 36 about the centerline X-axis in the two symmetrical groups of pattern mirrors. And, the first steering mirror SM1 is symmetrically laterally centered between the common mirror M41/M51 and the spinner 36 for intercepting the scan beam 32s from the spinner 36 over the center portion of the arcuate path, as illustrated in more particularity in FIG. 3.

The first steering mirror SM1 is optically aligned with at least one of the spinner facets 36a–c, and for example is optically aligned with only the second and third facets 36b,c as illustrated in FIG. 4. The first steering mirror SM1 is preferably positioned out of optical alignment with at least one of the spinner facets such as the first facet 36a as also illustrated in FIG. 4. In this way, the first steering mirror SM1 intercepts a portion of the scan beam 32s along its arcuate travel as the spinner 36 rotates for the second and third facets 36b,c but not for the first facet 36a.

As shown in FIG. 4, the first steering mirror SM1 is spaced vertically above the common mirror M41/M51 so that it intercepts the scan beam 32s from the spinner 36 for only the second and third facets 36b,c shown by the two phantom lines intersecting the first scan mirror SM1. Since the first spinner facet 36a has the maximum elevation angle E, the scan beam 32s is reflected below the first steering mirror SM1 to bypass this mirror and continue its normal path through the corresponding pattern mirrors. The scan beam portions intercepted by the first steering mirror SM1 laterally traverse this mirror and are reflected laterally across the second steering mirror SM2 spaced behind the spinner 36 from which the scan beam 32s is projected vertically upwardly through the first window 24 to form the two parallel, picket scan lines designated 45b and 45c.

The prefix 45 is used since these picket scan lines are created from intercepting respective portions of the fourth and fifth scan lines 4, 5 illustrated in FIG. 5 from the second window 26. FIG. 5 illustrates that the fourth and fifth scan lines 4b,c and 5b,c formed by the respective second and third spinner facets 36b,c have dotted line portions near the center of the second window 26 which have been removed by the first steering mirror SM1 and relayed through the second steering mirror SM2 to the first window 24 as the picket scan lines 45b,c.

In this way, the limited twenty-four line scan budget in this exemplary embodiment is distributed between the first and second windows 24, 26 in an improved manner as described above. By intercepting from the second window 26 a portion of selected scan lines such as the fourth and fifth scan lines 4b,c and 5b,c generated from the second and third spinner facets 36b,c, they may instead be used in the first window 24 for returning picket bar code reading capability which is otherwise lost by providing the ladder scan lines 2, 7. In effect, twenty-six scan lines are now found in the budget. This ability to redistribute the limited scan line budget between the two windows 24, 26 increases the versatility of generating complex scan patterns in the separate windows. The limited scan line budget may now be additionally modified in accordance with the present invention for providing enhanced bar code reading capability of the item 14.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A scanner for optically reading a bar code on a mutisided item comprising:

a housing including a substantially horizontal first window having front, back, third, and fourth edges, and a second window extending vertically upwardly from said front edge, and over which windows said item is swiped for defining in said item leading and trailing sides, a bottom side facing said first window, a front side facing said second window, and a back side facing away from said second window;

a laser disposed in said housing for producing a laser beam;

a spinner rotatably mounted in said housing in optical alignment with said laser, and including a plurality of circumferentially adjoining mirrored facets for sequentially reflecting said laser beam along an arcuate path to effect a scan beam;

means for rotating said spinner;

a plurality of pattern mirrors M optically aligned with said spinner for reflecting said scan beam through said first and second windows to effect for each revolution of said spinner a collective plurality of individual scan lines 1–8 arranged in first and second patterns corresponding with said first and second windows, respectively; and said pattern mirrors M include a triad set of first, second, and third mirrors optically aligned in series between said spinner and said first window for extending said first scan pattern to said back edge of said first window.

2. A scanner according to claim 1 wherein said laser is colinearly aligned with said spinner below said first window for projecting said laser beam from said front toward said back edges of said first window, with said back edge being disposed aft of said spinner.

3. A scanner according to claim 2 wherein said triad set mirrors are optically aligned with each other for projecting scan lines through said first window obliquely relative to said back edge for projecting said scan beam vertically through said first window to read said bar code in ladder orientation on said item.

4. A scanner according to claim 3 further comprising a pair of said triad sets symmetrically disposed about said spinner along said third and fourth edges of said first window for respectively scanning said laser beam from said spinner to effect a symmetrical set of said oblique scan lines adjacent said back edge for reading said ladder bar code on said leading side, trailing side, and back side of said item.

5. A scanner according to claim 4 wherein:
each of said spinner facets has an angular coverage within which said laser beam from said laser is reflected as said scan beam along said arcuate path;
said first triad mirrors are positioned within said angular coverage at opposite front corners of said first window for first reflecting said scan beam from said spinner; and
said second and third triad mirrors of said triad set pair are disposed together at diametrically opposite back corners of said first window for reflecting in turn said scan beam from respective ones of said first triad mirrors to project said scan beam vertically through said first window.

6. A scanner according to claim 5 wherein said triad set mirrors are optically aligned to effect an intersecting pair of said symmetrical oblique scan lines through said first window so that each triad set is effective for reading said ladder bar code on said item back side and on a different one of said leading and trailing sides.

7. A scanner according to claim 3 wherein said pattern mirrors are symmetrically disposed about said spinner in two symmetrical groups along said third and fourth edges of said first window to effect symmetrical scan lines in each of said first and second patterns.

8. A scanner according to claim 7 wherein said spinner includes three of said facets disposed at different elevation angles for effecting three sets of said scan lines from said pattern mirrors for increasing density of said first and second patterns.

9. A scanner according to claim 3 further comprising means for steering a portion of said scan lines from said second window to said first window.

10. A scanner according to claim 9 wherein said pattern mirrors are symmetrically disposed about said spinner in two symmetrical groups along said third and fourth edges of said first window to effect symmetrical scan lines in each of said first and second patterns.

11. A scanner according to claim 10 wherein:
said spinner facets are disposed at different elevation angles for correspondingly effecting different sets of said scan lines from said pattern mirrors; and
said steering means are positioned in optical alignment with said spinner to intercept said scan line portion from at least one of said spinner facets.

12. A scanner according to claim 11 wherein said steering means are positioned out of optical alignment with at least one of said spinner facets for not intercepting said scan beam therefrom.

13. A scanner according to claim 11 wherein said steering means are effecting for projecting said steered scan line portion substantially parallel to said back edge of said first window.

14. A scanner according to claim 13 wherein said steering means comprise a first steering mirror optically aligned between said spinner and said pattern mirrors for intercepting said scan line portion.

15. A scanner according to claim 14 wherein said steering means further comprise a second steering mirror optically aligned with said first steering mirror on opposite sides of said spinner.

16. A scanner according to claim 15 wherein said steering means are disposed symmetrically with said spinner.

17. A scanner according to claim 16 wherein:
said pattern mirrors include a common mirror disposed symmetrically with said spinner in said two groups; and
said first steering mirror is symmetrically disposed between said common mirror and said spinner for intercepting said scan beam from said spinner over a portion of said arcuate path.

18. A scanner according to claim 17 wherein:
said spinner includes three of said facets disposed at said different elevation angles; and
said first steering mirror is optically aligned with two of said facets for intercepting said scan line portions therefrom, and is out of optical alignment with said third facet to prevent steering of said scan beam therefrom.

19. A scanner for optically reading a bar code on a multisided item comprising:
a housing including a substantially horizontal first window having front, back, third, and fourth edges, and a second window extending vertically upwardly from said front edge, and over which windows said item is swiped for defining in said item leading and trailing sides, a bottom side facing said first window, a front side facing said second window, and a back side facing away from said second window;
a laser disposed in said housing for producing a laser beam;
a spinner rotatably mounted in said housing in optical alignment with said laser, and including a plurality of circumferentially adjoining mirrored facets for sequentially reflecting said laser beam along an arcuate path to effect a scan beam;
means for rotating said spinner;
a plurality of pattern mirrors optically aligned with said spinner for reflecting said scan beam through said first and second windows to effect for each revolution of said spinner a collective plurality of individual scan lines 1–8 arranged in first and second patterns corresponding with said first and second windows, respectively; and
means for steering a portion of said scan lines from said second window to said first window.

20. A scanner according to claim 19 wherein said steering means comprise a first steering mirror optically aligned between said spinner and said pattern mirrors for intercepting said scan line portion.

21. A scanner according to claim 20 wherein said steering means further comprise a second steering mirror optically aligned with said first steering mirror on opposite sides of said spinner.

22. A scanner according to claim 21 wherein:
said pattern mirrors include a common mirror disposed symmetrically with said spinner; and
said first steering mirror is symmetrically disposed between said common mirror and said spinner for intercepting said scan beam from said spinner over a portion of said arcuate path.

23. A scanner according to claim 22 wherein said first and second steering mirrors are optically aligned with said spinner for projecting said steered scan line portions substantially parallel to said back edge of said first window.

24. A scanner according to claim 23 wherein:

said spinner includes three of said facets disposed at different elevation angles; and said first steering mirror is optically aligned with two of said facets for intercepting said scan line portions therefrom, and is out of optical alignment with said third facet to prevent steering of said scan beam therefrom.

25. A method of scanning a bar code on a multisided item comprising:

generating a plurality of individual scan lines arranged in first and second patterns through corresponding first and second obliquely adjoining windows;

swiping said item with a bottom side facing downwardly toward said first window, and with a front side facing said second window for illuminating thereon said scan lines; and said first pattern including ladder scan lines projecting vertically on said item from a back side thereof for reading a ladder bar code thereon.

26. A method according to claim 25 wherein said first pattern includes a symmetrical set of said ladder scan lines projecting vertically on said item along said back side, and along leading and trailing sides thereof.

* * * * *